United States Patent
Wiener et al.

[15] 3,685,077
[45] Aug. 22, 1972

[54] NON-COUNTERBALANCED FRONT-OF-DOCK DOCKBOARD

[72] Inventors: Thomas J. Wiener, Brown Deer; Robert C. Kuhns, Elm Grove, both of Wis.

[73] Assignee: Kelley Company, Inc., Milwaukee, Wis.

[22] Filed: Feb. 19, 1971

[21] Appl. No.: 116,768

[52] U.S. Cl. .................................................. 14/71
[51] Int. Cl. ............................................ B65g 11/00
[58] Field of Search ............................................ 14/71

[56] References Cited

UNITED STATES PATENTS 3,570,033  3/1971  Hovestad .................... 14/71
3,486,181  12/1969  Hecker ....................... 14/71

*Primary Examiner*—Jacob L. Nackenoff
*Attorney*—Andrus, Sceales, Starke & Sawall

[57] ABSTRACT

A dockboard to be mounted on the front surface of a loading dock and adapted to bridge the gap between the dock and the bed of a carrier. The dockboard includes a ramp which is composed of a deck plate and an extension lip. The rear edge of the deck plate is hinged to the frame of the dockboard by a series of hinge loops, while the lip is pivotally connected to the forward edge of the deck plate and is adapted to engage the bed of the carrier when the ramp is in the operating position. In the storage position, the deck plate is located in a generally horizontal position and the lip hangs downwardly from the deck plate in a generally vertical pendant position. To move the ramp to the operating position, the deckplate, which is not counter-balanced, is manually pivoted upwardly to a generally vertical position, and a lug that is pivotally connected to the undersurface of the lip engages an abutment on the frame to lock the deckplate in the vertical position. The deck plate is then forced outwardly away from the dock and the linkage between the deck plate, the lip and the frame enables the outer edge of the lip to inscribe a generally curved path in which it initially moves upwardly to clear the bed of the carrier and then downwardly into engagement with the carrier bed. After loading, the carrier merely pulls away from the dock and the ramp will move by gravity to the storage position.

17 Claims, 10 Drawing Figures

PATENTED AUG 22 1972  3,685,077

INVENTOR.
THOMAS J. WIENER
ROBERT C. KUHNS
BY
Andrus, Sceales, Starke & Sawall

ATTORNEYS

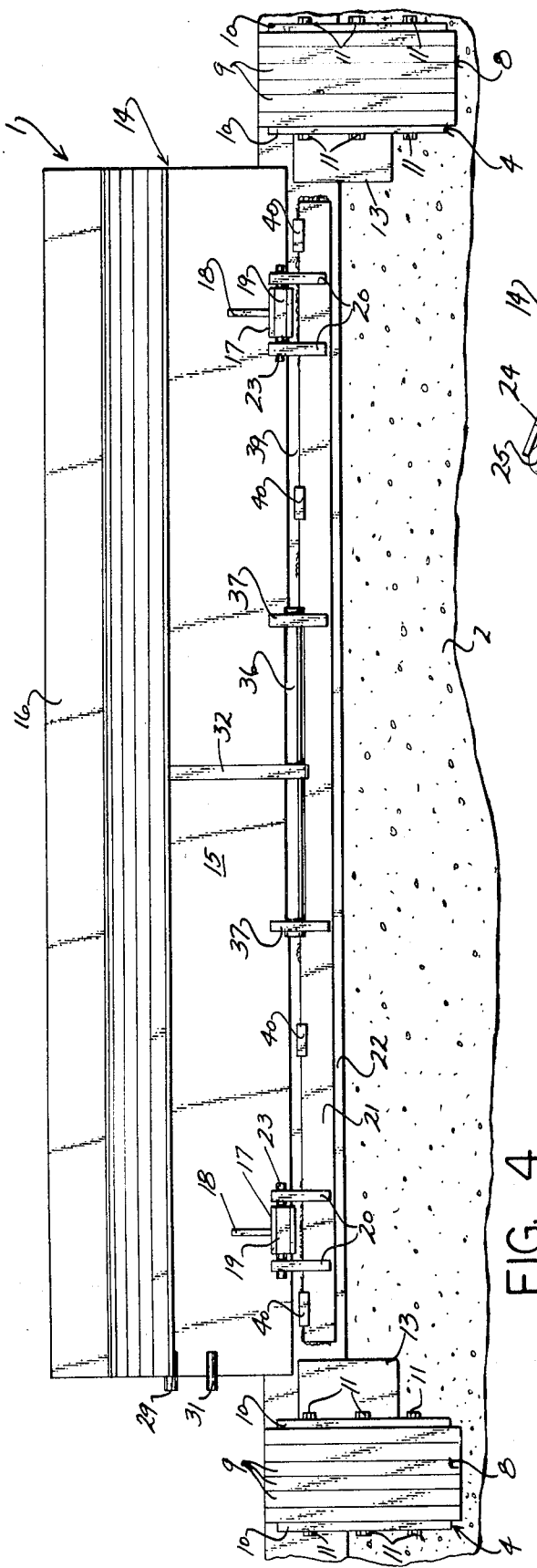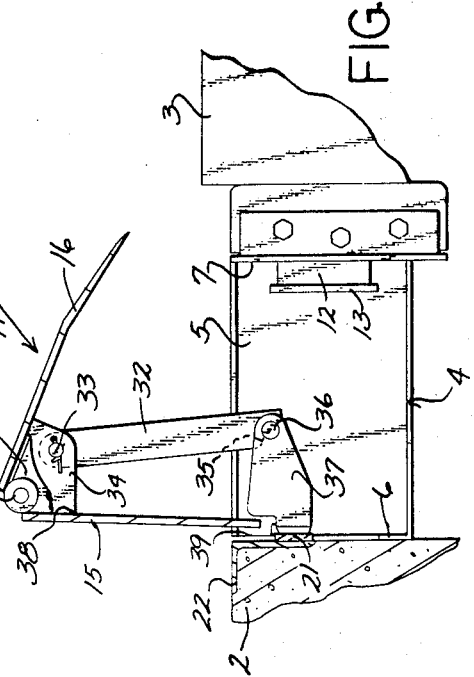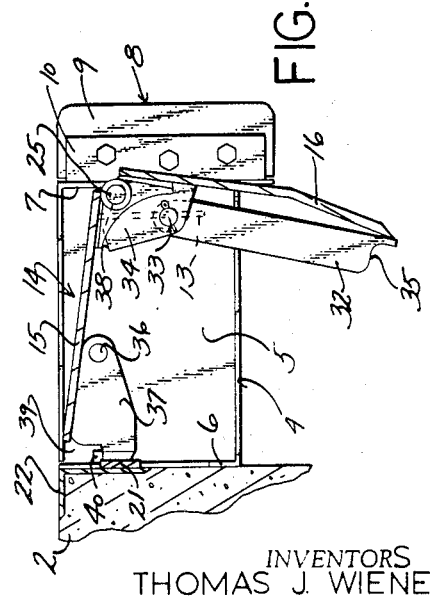
INVENTORS
THOMAS J. WIENER
ROBERT C. KUHNS
ATTORNEYS

PATENTED AUG 22 1972 3,685,077

INVENTORS
THOMAS J. WIENER
ROBERT C. KUHNS
BY
ATTORNEYS

NON-COUNTERBALANCED FRONT-OF-DOCK DOCKBOARD

BACKGROUND OF THE INVENTION

This invention relates to a dockboard and more particulary to a dockboard to be mounted on the front surface of a loading dock and adapted to bridge the gap between the dock and the bed of a carrier.

One form of dockboard commonly used is a type which attaches to the front surface of the dock and thus does not require a pre-formed pit in the dock and can be utilized with existing docks. The conventional front-of-dock dockboard includes a ramp which is composed of a deckplate and an extension lip. The rear edge of the deckplate is hinged to the dock and the lip is pivotally connected to the forward edge of the deck plate. In the storage position, the deck plate is generally horizontal and the lip hangs downwardly in a pendant position. To move the ramp to the operating position, the deck plate is pivoted upwardly to elevate the lip to a position above dock level, and the deck plate and lip are then moved forwardly to enable the lip to engage the bed of the carrier. As the deck plate and lip have a substantial weight, the practice in the past has been to utilize a counterbalancing mechanism to counterbalance the weight of the ramp so that the ramp can be more easily lifted to the upper position. Not only is the counterbalancing mechanism expensive, adding to the cost of the unit, but it frequently requires adjustment. Moreover, as the counterbalancing mechanism exerts an upward force on the ramp it may tend to prevent a firm contact between the lip and the carrier bed, particularly when a fork lift truck or other load jars the ramp as it moves across the ramp.

SUMMARY OF THE INVENTION

The invention is directed to a dockboard to be mounted on the front surface of the dock which eliminates the need for a counterbalancing mechanism. In accordance with the invention, the dockboard includes a ramp which is composed of a deck plate and an extension lip. The rear edge of a deck plate is hinged to the dock by a plurality of hinge loops, while the lip is pivoted to the forward edge of the deck plate.

In the storage position the dockboard is located in a generally horizontal cross traffic position while the lip assumes a pendant position in which it hangs downwardly in front of the dock.

When it is desired to move the ramp to the operating position, the deck plate is manually pivoted upwardly to a generally vertical position, and a lug, pivotally attached to the undersurface of the lip, engages an abutment on the dockboard frame to lock the deck plate in the upper vertical position. In this upper position the lip is disposed at an acute angle with respect to the deck plate and upper edge of the lip is located above dock level.

The deck plate is then forced outwardly away from the dock and the linkage between the deck plate, the lip, and the supporting frame enables the outer edge of the lip to inscribe a generally curved path and move into engagement with the bed of the carrier. In moving in this curved path, the outer edge of the lip initially moves upwardly, thereby insuring that the lip will clear the bed of the carrier, and then downwardly into engagement with the carrier bed.

As the ramp is not counterbalanced, the deck plate is moved to the upper vertical position by use of an operating handle which engages pins on the side edge of the deck plate. By pivoting the handle from a vertical position to a horizontal position the operator can readily pivot the deck plate to the upper vertical position. The handle employed to pivot the deck plate from the horizontal storage position to the upper vertical position is stored in the gap or clearance between the rear edge of the deck plate and the dock. This not only provides a convenient location for storage, but prevents damage or misplacement of the handle, and serves to prevent the accumulation of foreign materials in this clearance.

The hinge loop connection between the deck plate and the dock enables the deck plate and the attached lip to float vertically when in the operating position. This insures that the lip will always bear firmly against the bed of the carrier even though the bed may not be level but may be tilted slightly in a lateral direction.

By eliminating the counterbalancing mechanism which is normally employed with a dockboard of this type, the overall cost of the dockboard is substantially reduced. The elimination of the counterbalancing mechanism also insures a positive firm contact between the lip and the bed at all times. With the use of a counterbalancing mechanism the counterbalancing force is continually urging the ramp to the upper or jack-knife position. The action of a lift truck or other load passing over the ramp may jar the ramp to a point where the counterbalancing mechanism could act to move the ramp to the upper position. The elimination of the counterbalancing mechanism also reduces maintenance in that no adjustment of the counterbalancing force is required during the life of service of the dockboard.

The linkage between the deckplate and the lip enables the outer edge of the lip to follow a generally curved path in moving from the vertical upper position to the operating position and insures that the lip will clear the bed of a carrier even though the carrier may be located as much as 6 inches or more above dock level. In a conventional dockboard of this type, the lip had to be manually raised to an extended position and held in the extended position while being lowered to enable it to clear the bed of the carrier.

Other objects and advantages will appear in the course of the following description.

The drawings illustrate the best made presently contemplated of carrying out the invention.

In the drawings:

FIG. 4 is a front elevation of the dockboard with the ramp in the elevated position;

FIG. 5 is a transverse section of the dockboard with the ramp shown in the cross traffic position;

FIG. 6 is a view similar to FIG. 5 with the ramp shown in the elevated position;

Figure 1:
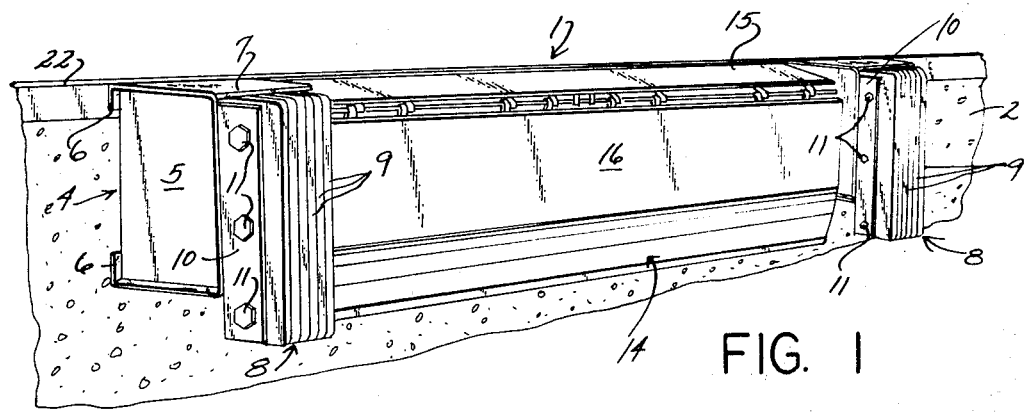
FIG. 1 is a perspective view of the dockboard of the invention with the ramp in the cross traffic position.
Figure 2:
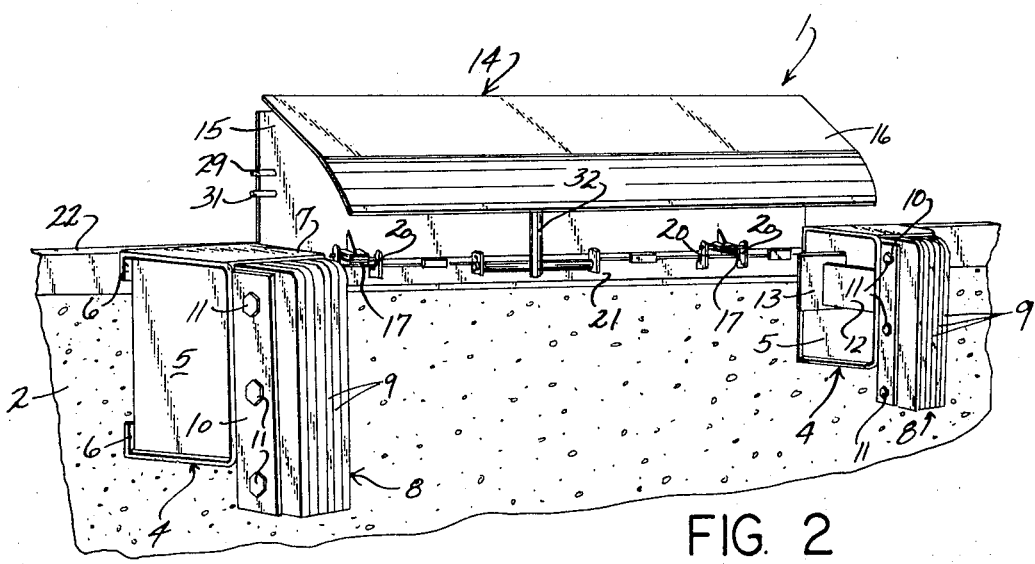
FIG. 2 is a perspective view of the dockboard with the ramp in the elevated position.
Figure 3:
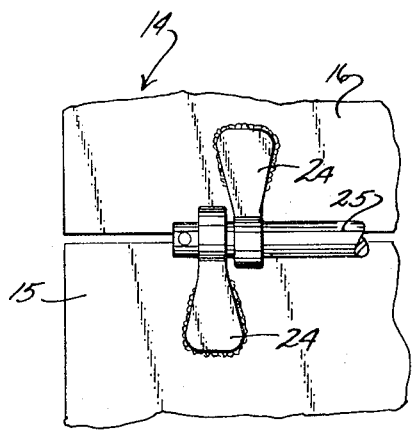
FIG. 3 is an enlarged fragmentary plan view of the underside of the ramp showing the hinged connection between the deck plate and the lip.

As shown in the drawings, a dockboard 1 is mounted on the front surface of a loading dock 2 and is adapted to bridge the gap between the dock and the bed of a truck or carrier 3 located in front of the dock.

Figure 9:
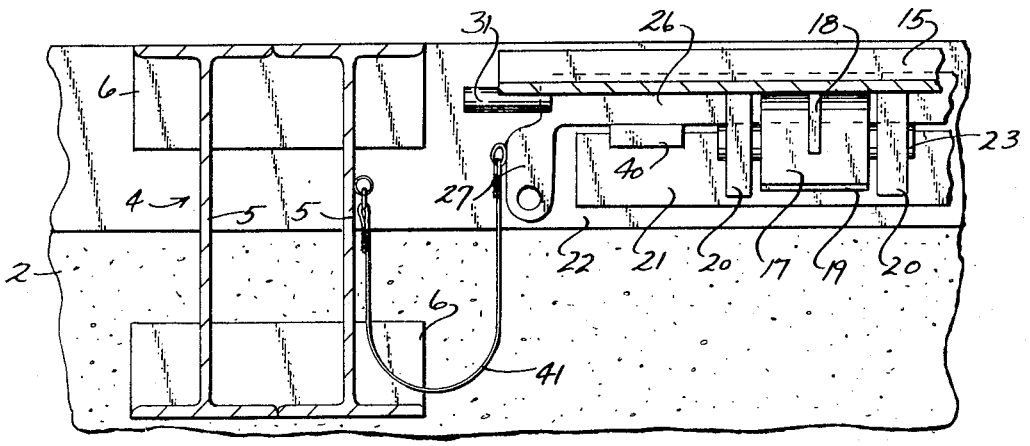
FIG. 9 is an enlarged fragmentary front elevation with parts broken away in section.

The dockboard of the invention includes a structural frame, indicated generally by 4, including two pair of I-beams 5 which extend outwardly from the dock 2 at both sides of the dockboard. As best illustrated in FIGS. 1 and 9, the upper flanges of the I-beams 5 are generally flush with the upper surface of the dock and the vertical webs of each pair of I-beams in combination with the corresponding upper and lower flanges define a generally box-shaped supporting structure. As shown in FIG. 9, the inner ends of the I-beams are welded to the straps 6 which are bolted or welded to the front surface of dock 2. Welded across the outer ends of each pair of I-beams 5 is a vertical end plate 7 which supports a resilient bumper 8.

The bumper 8 can be any conventional type of resilient cushion utilized with dockboards. As illustrated, the bumper 8 comprises a series of resilient laminated sections 9 which are secured between side plates 10 by a series of tie rods 11 that are welded to the side plates. Side plates 10 are welded to, and extend outwardly from plate 7. The bumper 8 projects outwardly beyond the structural frame 4 to protect the frame from damage as the carrier backs toward the dock.

As shown in FIG. 1, a vertical plate 12 is welded to the edge of each of the end plates 7 and extends inwardly toward the dock. A stop plate 13 is welded to the inner edge of each plate 12 and the stop plate extends laterally inward to a position where it can function as a cross traffic stop, as will be described hereinafter.

Dockboard 1 also includes a ramp 14 which is composed of a deck plate 15 and a lip 16. The inner edge of the deck plate 15 is pivotally connected to the structural frame 4 by means of a pair of hinge loops 17 which are welded to the underside of the deck plate adjacent its inner edge. In addition, triangular gusset plates 18 are welded between the hinge loops 17 and the deck plate 15. Cross bars 19 are welded across the open inner end of each of the hinge loops 17 to close the loops.

Each hinge loop 17 is pivotally connected between a pair of lugs 20 that extend outwardly from a plate 21 secured to the vertical flange of the curb angle 22 which reinforces the upper edge of the dock 2. Hinge pins 23 extend through the interior of each hinge loop 17 as well as through aligned openings in the lugs 20. This connection permits the deck plate 15 to be pivoted with respect to the dock and the hinge loops 17 enable the deck plate to float vertically with respect to the dock when the deck plate is in the operating position. The floating action compensates for any tilt in the bed of the carrier 3 and insures that the lip 16 will always bear firmly against the carrier bed.

The lip 16 is pivotally connected to the outer edge of the deck plate 15 by means of a series of duckbill-shaped lugs 24. Alternate lugs 24 are welded to the deck plate 15 and to the lip 16, and hinge rods 25 extend through aligned openings in the lugs 24. This connection enables the lip 16 to pivot downwardly with respect to the deck plate 15, but prevents the lip from pivoting upwardly beyond an extended position in which it extends outwardly from the deck plate in substantially a common plane.

The dockboard is shown in the storage position in FIG. 1. In this position, the deck plate 15 is slightly below horizontal with the side edges of the deck plate bearing on the upper edges of the stops 13. Due to the pivotal connection between the lip 16 and the deck plate 15, the lip will assume a generally vertical or pendant position in which it hangs downwardly from the deck plate.

The ramp 14 is adapted to be moved upwardly to a position where the lip 16 will clear the bed of the carrier 3 located in front of the dock and is then moved downwardly and outwardly to an operating position whereat the lip will engage the bed of the carrier. The ramp is elevated manually by use of an elongated handle 26 having a foot portion 27 which extends generally at right angles to the handle. The foot 27 has a hole 28 which is adapted to receive a pin 29 welded to the undersurface of the deck plate 15, while the inner end of the foot 27 is provided with a notch 30 that is adapted to receive a second pin 31 also secured to the undersurface of the deck plate. Both pins 29 and 31 project outwardly of the side edge of the deck plate 15.

Figure 8:
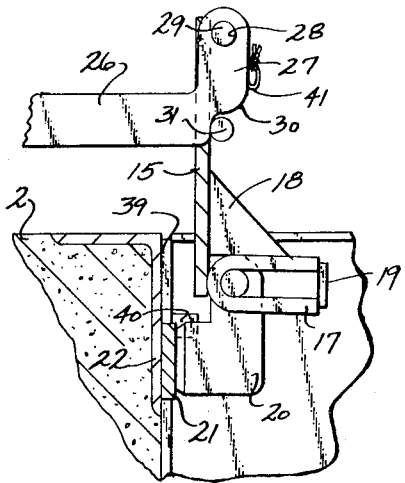
FIG. 8 is a view similar to FIG. 7 showing the deck plate in the vertical position.
Figure 7:
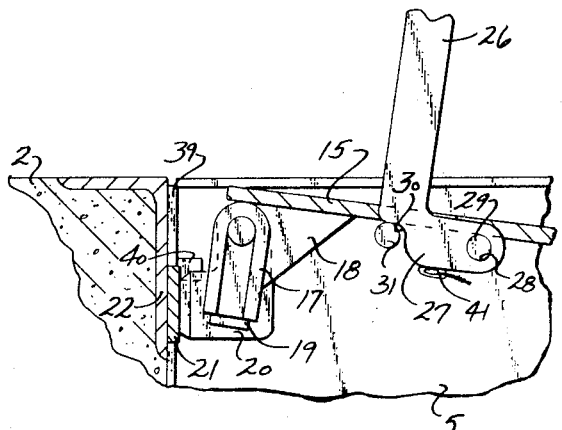
FIG. 7 is an enlarged fragmentary transverse section showing the ramp in the cross traffic position and the lifting lever engaged with the deck plate.

To elevate the deck plate to a generally vertical position, the handle is positioned vertically, as illustrated in FIG. 7, with the hole 28 engaged with the pin 29 and the notch 30 engaged with pin 31. By pivoting the handle downwardly to a generally horizontal position, the deck plate 15 will be pivoted to a substantially vertical position, as illustrated in FIG. 8. The ramp 14 is not counterbalanced, but due to the mechanical advantage achieved by the handle 26, the ramp can be readily lifted to the elevated position.

To lock the deckplate 15 in the elevated vertical position, a locking bar 32 is utilized. The upper end of the bar 32 is pivotally connected by pin 33 to a pair of lugs 34 welded to the undersurface of lip 16, while the lower or opposite end of the bar is formed with a notch 35 that is adapted to engage a fixed horizontal rod 36 attached to the frame 4 as the deck plate is elevated to the vertical poistion. Rod 36 is carried by a pair of lugs 37 that extend outwardly from the plate 21.

In the storage position of the ramp, as illustrated in FIG. 5, the bar 32 hangs downwardly from the pivot pin 33. As the deck plate 15 is pivoted upwardly by the operator, the bar 32 rides along the rod 36 and when the deck plate 15 reaches a substantially vertical position the notch 35 will fall into engagement with the rod 36. With the notch engaged with the rod 36, the operator can then disengage the handle 26 and the deck plate will remain in the vertical position.

In the elevated position, the lip 16 will be located at an acute angle with respect to the deck plate 15, as shown in FIG. 6. The lugs 34 are shaped so that the ends 38 of the lugs engage the undersurface of the deck plate to hold the lip at an acute angle with respect to the deck plate. The specific angle is dependent upon the relative length of the deck plate and lip and can be in the range of 60° to 75°. In this elevated position, the outer or free edge of the lip 16 is located several inches above dock level.

Figure 10:
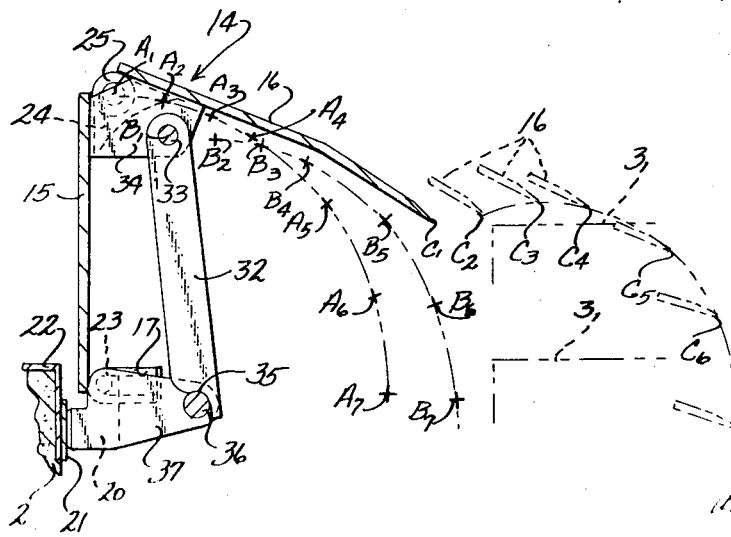
FIG. 10 is a transverse section showing the curved path of movement inscribed by the outer edge of the lip as the ramp is moved from the elevated position to the loading position.

To move the ramp 14 to the operating position, the operator, after removal of the handle 26, kicks or pushes the deck plate 15 outwardly causing the deck plate and the lip to move toward the carrier 3. The linkages between the frame, deck plate, lip and licking bar are such that this force will cause the outer end of the lip to travel through a generally curved path as shown in FIG. 10. During this movement, the locking bar 32 will be maintained in engagement with the rod 36 due to the weight of the deck plate and lip which exerts a downward force on the locking bar against the rod 36 and the bar will pivot on the rod. When the lip engages the bed of the carrier the downward force exerted by bar 32 on rod 36 will be released thereby enabling the bar to pivot downwardly by gravity with the notch 35 moving out of engagement with the rod 36.

The linkages involved which cause the lip 16 to move in the curved path are best illustrated in FIG. 10. The linkages is composed of four pivotally interconnected links, deck plate 15, lugs 34, bar 32 and lugs 37 and in the elevated position of the ramp, the four pivots 23, 25, 33 and 36 are in a quadrilateral relationship, with pivots 23 and 36 being fixed in position. In this position the deck plate 15 is substantially vertical, while the locking bar 32 is in an overcenter position, at a slight angle to the vertical. As the deck plate is moved outwardly, the locking bar 32 will initially pivot to a centered or vertical position and then to an undercenter position causing the pivot 33 to move in an upward curved path as it travels over center to under center position. On the other hand, the deck plate 15 which originally was at a vertical position will pivot downwardly so that the pivot 25 will follow a downwardly curved path. As the links between the pivots are of fixed length, this movement of pivots 25 and 33 will cause the tip of the lip 16 to initially inscribe an upwardly curved path of travel which enables the lip to clear the bed of the carrier even though the carrier maybe located a substantial distance above dock level.

The relative positions of the pivot 25, pivot 33 and lip 16 are shown in FIG. 10. The original positions of pivot 25, pivot 33 and lip 16 are shown by $A_1$, $B_1$, and $C_1$, respectively. As the deck plate 15 is pivoted outwardly, the pivot 25 moves through the points $A_2$, $A_3$, $A_4$, etc., the pivot 33 moves through the corresponding points $B_2, B_3$, $B_4$, etc., and the lip moves through the points $C_2$, $C_3$, $C_4$, etc. Thus, the lip will travel downwardly in a curved path of travel until it engages the bed of the carrier.

As previously noted, weight of the deck plate 15 and the lip 16 exert a force downwardly through the locking bar 32 to maintain the notch 35 in engagement with the rod 36 until the lip engages the bed of the carrier. The relative length of the four links which interconnect the four pivots 23, 25, 33 and 36 is such that the lip is located at an acute angle with respect to the deck plate when the ramp is moved forwardly. When the lip contacts the carrier bed 3, the weight of the deck plate and lip are then supported by the carrier bed. This causes rotation of the lip relative to the deck plate, moving the lip into a substantially common plane with the deck plate. This pivotal action of the lip about pivot 25 results in an increase in distance between pivots 33 and 36, thereby causing the notch 35 to lose contact with rod 36 so that the bar 32 will swing by gravity to a generally vertical position.

This linkage which results in the lip 16 initially inscribing an upward curved path of travel in moving from the elvated position to the operating position is a distinct advantage in that it enables the lip to clear the bed of the carrier which may be located a number of inches above dock level. In the conventional dockboard of this type, it is necessary for the operator to manually pivot the lip upwardly as it moved outwardly to insure that it clears the bed of the carrier. Not only do the deck plate and lip have a substantial weight, but as the lip is located outward of the dock, it requires the operator to bend over a difficult and awkward position while pivoting the lip upwardly to clear the carrier bed. This operation is not required with the dockboard of the invention, for the lip will automatically swing upwardly as the deck plate is pivoted downwardly from the elevated position.

After the loading or unloading operations have been completed, the carrier merely pulls away from the dock causing the lip 16 to pivot downwardly to the pendant position and the deck plate will pivot downwardly until it engages the stops 13 to limit its descent and maintain the deck plate in the storage position.

In some situations it may be desirable to remove the ramp from the bed of the carrier while the carrier is still positioned adjacent the dock. To accomplish this, the operator attaches the handle 26 to the pins 29 and 31 and then pivots the deck plate 15 upwardly, causing the lip to move upwardly out of engagement with the carrier bed. The deck plate is pivoted upwardly to a location short of the position where the notch 35 of bar 32 will engage the rod 36, and while holding the handle, the operator then permits the ramp to lower by gravity until the deckplate engages the stops 13. As the bar 32 is not engaged with rod 36 at this time, the lip 16 will not follow an upwardly curved path, but instead will merely descend to the storage position.

The invention also provides a unique storage arrangement for the handle 26. When not in use the handle 26 is stored within the clearance 39 between the curb angle 22 and the inner edge of the deck plate 16. In the storage position, the handle rests on a series of spaced supports 40 welded to the plate 21. As shown in FIG. 9, the handle 26 has a length substantially equal to the width of the ramp 14 so that it will extend generally the entire length of the clearance 39. A chain 41 can connect the end of the handle 26 with the dock so that the handle will not be misplaced.

Storing the handle 26 in the clearance 39 not only provides a convenient out-of-the-way storage location, but also serves to prevent foreign material or debris from collecting in the clearance, as well as bridging the gap between the dock and the inner edge of the deckplate 15, thereby preventing small wheels or casters on loading vehicles from falling into the clearance or gap 39.

The dockboard of the invention eliminates the conventional counterbalancing mechanism which is normally utilized with a front-of-the-dock type of dockboard. Due to the use of the long handle 26 and the mechanical advantage provided, the ramp 14 can be readily pivoted to the upper elevated position. Moreover, due to the linkages involved, it is not necessary to manually elevate or pivot the lip upwardly as it is moved to the operating position.

By eliminating the counterbalancing mechanism, a firm contact between the lip and the bed of the carrier is insured at all times. With the use of a counterbalancing force, such as springs, there is a possibility that impact or vibration caused by a lift truck or other load passing over the ramp could momentarily lessen the weight of the ramp to a point where the counterbalancing mechanism would elevate the ramp to the vertical elevated position. However, with the present dockboard, this possibility is entirely eliminated.

The elimination of the counterbalancing mechanism not only reduces the initial cost of the unit, but also reduces maintenance costs, for a counterbalancing mechanism requires occasional adjustment during it service life.

Various modes of carrying out the invention are contemplated as being within the scope of the following claims particularly pointing out and distinctly claiming the subject matter which is regarded as the invention:

We claim:

1. A dockboard to be mounted on the front of a loading dock, comprising a supporting structure secured to the dock, a deck plate having its rear edge pivotally connected to the supporting structure at a first pivot, a lip having its rear edge connected to the forward edge of the deck plate at a second pivot, said deck plate and lip in combination defining a ramp movable from a first storage position to a second elevated position whereat the deck plate is located generally vertically and the lip is disposed at an acute angle with respect to the deck plate, to a third operating position whereat the lip forms an extension to the deck plate and rests on the bed of a carrier disposed in front of the dock, a latching member pivotally connected to the undersurface of the lip at a third pivot and including a latching surface, an abutment on the supporting structure and disposed to be engaged by the latching surface when the ramp is moved to the second elevated position, engagement of said latching surface with said abutment constituting a fourth pivot, said pivots being disposed in a quadrilateral relationship when the ramp is in the second elevated position with the third pivot being offset to the rear in an overcenter position from a vertical plane extending through the fourth pivot, means for maintaining the lip at an acute angle with respect to the deck plate when the ramp is at the elevated position, said third pivot moving forwardly through said vertical plane as the ramp is moved from the elevated position to the operating position to initially cause the forward edge of the lip to travel in an upward generally curved path, said curved path of travel enabling the lip to clear the bed of the carrier located in front of the dock.

2. The dockboard of claim 1, including means responsive to the lip being moved to the extended position to release the latching surface from engagement with the abutment.

3. The dockboard of claim 1, wherein the abutment is a generally curved member and said latching surface is curved to compliment said curved member and enable the latching surface to pivot on said curved member.

4. The dockboard of claim 1, wherein said latching means comprises an elongated bar and said latching surface comprises a generally curved socket spaced a substantial distance from the third pivot.

5. The dockboard of claim 1, and including elevating means for raising the ramp from the storage position to the elevated position, said elevating means being operably connected to the deck plate.

6. The dockboard of claim 5, wherein said elevating means comprises a handle and connecting means for removably connecting said handle to a side edge of said deck plate.

7. The dockboard of claim 6, wherein said handle includes an elongated rod and a foot disposed at an angle with respect to said rod, said connecting means being associated with said foot.

8. The dockboard of claim 7, wherein said foot is provided with a hole and a notch and said deck plate is provided with a pair of spaced pins, one of said pins being receivable in said hole and the other of said pins being received within said notch, said handle member being disposed substantially vertically when the ramp is in the storage position and being pivotable to a generally horizontal position to thereby pivot said ramp to the elevated position.

9. The dockboard of claim 1, wherein the pivotal connection between the deck plate and the supporting structure comprises a hinged loop secured to the deck plate, and a lug secured to the supporting structure and having an opening in alignment with the loop of the hinge loop, and a hinge pin disposed within the opening in the lug and the loop of said hinge loop, said hinge loop permitting the ramp to float vertically with respect to the supporting structure when the ramp is in the operating position.

10. The dockboard of claim 1, wherein the second pivot is located above said first pivot and is in substantial vertical alignment therewith when the ramp is in the elevated position.

11. The dockboard of claim 10, wherein said fourth pivot is located at a level slightly beneath the level of the first pivot and the third pivot is located at a level beneath the level of the second pivot when the ramp is in the elevated position.

12. The dockboard of claim 1, and including stop means connected to the supporting structure and disposed to be engaged by the deck plate when the ramp is in the storage position.

13. A dockboard to be mounted on the front of a loading dock, comprising a supporting structure secured to the dock, a deck plate having its rear edge pivotally connected to the supporting structure at a first pivot, a lip having its rear edge connected to the forward edge of the deck plate at a second pivot, said deck plate and lip in combination defining a ramp movable from a first storage position to a second elevated position whereat the deck plate is located generally vertically and the lip is disposed at an acute angle with respect to the deck plate, to a third operating position whereat the lip forms an extension to the deck plate and rests on the bed of a carrier disposed in front of the dock, latch means pivotally connected to the lip, an abutment connected to the supporting structure and disposed to be engaged by the latching means as the ramp is moved to the elevated position to lock the ramp in the elevated position, means for maintaining the lip at an acute angle with respect to the deck plate when the ramp is at the elevated position, and means responsive to forward pivotal movement of the deck plate from the elevated position toward the operating position for moving the forward edge of the lip in an upward and forward path of travel to enable the forward edge of the lip to clear the bed of a carrier located in front of the dock.

14. The dockboard of claim 13, wherein said means for maintaining the lip at an acute angle comprises a lug mounted on the underside of the lip and engageable with the deck plate.

15. A dockboard to be mounted on the front of a loading dock, comprising a supporting structure secured to the dock, a deck plate having its rear edge pivotally connected to the supporting structure at a first pivot, a lip having its rear edge connected to the forward edge of the deck plate at a second pivot, said deck plate and deck in combination defining a ramp movable from a first storage position to a second elevated position whereat the deck plate is located generally vertically and the lip is disposed at an acute angle with respect to the deck plate, to a third operating position whereat the lip forms an extension to the deck plate and rests on the bed of a carrier disposed in front of the dock, latch means including a first latching element pivotally connected to the lip, a second latching element connected to the supporting structure and disposed to be engaged by the first latching element as the ramp is moved to the elevated position to thereby lock the ramp in the elevated position, means for maintaining the lip at an acute angle with respect to the deck plate when the ramp is in the elevated position, and means responsive to forward movement of the ramp from the elevated position toward the operating position for moving the forward edge of the lip in an upward and forward path of travel to enable the forward edge of the lip to clear the bed of a carrier located in front of the dock, said first and second latching elements being automatically disengaged as said ramp is moved from the elevated position toward the operating position.

16. The dockboard of claim 15, wherein said means for maintaining the lip at an acute angle with respect to the deck plate comprises a member interacting between the undersurface of the lip and the undersurface of the deck plate.

17. The dockboard of claim 1, and including a lug secured to the undersurface of the lip, said latching member being pivotally attached to the lug at said third pivot, said lug having a surface disposed to engage the undersurface of the deck plate when the ramp is in the elevated position to thereby act as said means for maintaining the lip at said acute angle with respect to the deck plate.

* * * * *